R. MONTGOMERY.
Iron Railway Car.
No. 3,542.
Reissued July 6, 1869.
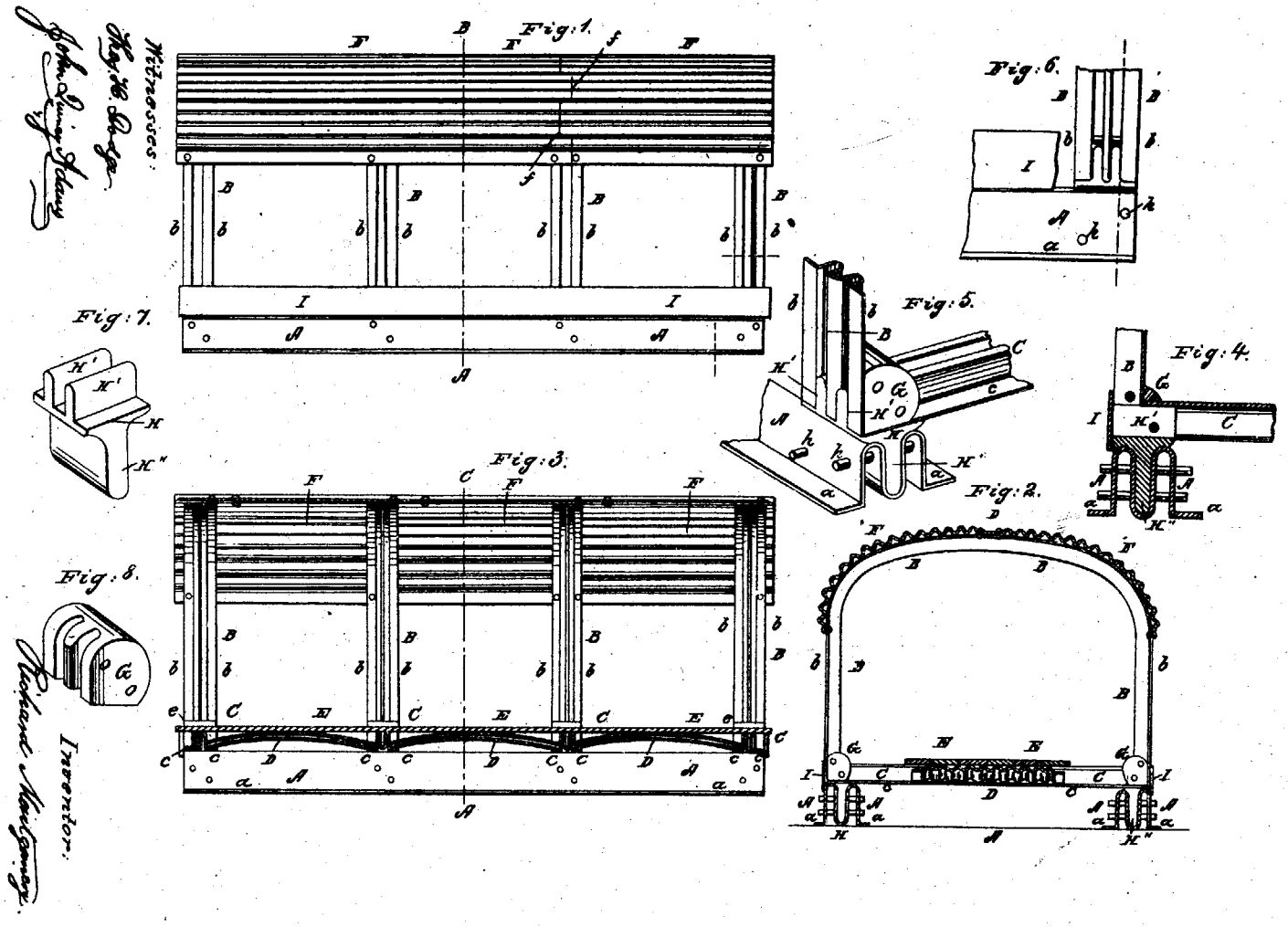
Witnesses:
Thos. H. Dodge
John Quincy Adams
Inventor:
Richard Montgomery.

United States Patent Office.

RICHARD MONTGOMERY, OF NEW YORK, N. Y.

*Letters Patent No.* 29,510, *dated August* 7, 1860; *reissue No.* 1,325, *dated July* 22, 1862; *reissue No.* 3,542, *dated July* 6, 1869.

DIVISION A.

IMPROVED IRON RAILWAY-CAR.

The Schedule referred to in these Letters Patent and making part of the same.

*To all whom it may concern:*

Be it known that I, RICHARD MONTGOMERY, of the city, county, and State of New York, have invented certain new and useful Improvements in Iron-Cars for Railroads, and other purposes; and I do hereby declare that the following is a full and exact description thereof, reference being had to the accompanying drawings, making a part of this specification, in which—

Figure 1 represents a side view of the frame of a freight-car, constructed according to my invention.

Figure 2, a section on line A B, fig. 1, and A C, fig. 3.

Figure 3, a section on line A D, fig. 2, or a longitudinal vertical section through the centre of the car.

Figures 4, 5, and 6, represent, on an enlarged scale, detached sections of parts of the car, to show more fully the means of uniting the framework thereof.

Figures 7 and 8 represent the coupling-pieces by which the top, bottom, and cross-pieces may be united.

The nature of the invention consists in the production of very strong and durable, yet cheap, light, and completely fire-proof railroad-cars, and other vehicles, by combining beams of longitudinally-corrugated metal, to constitute the framework thereof, and also in covering and enclosing the same with plates of plain or corrugated sheet-metal.

The manner of producing the longitudinally-corrugated metallic beams which I employ, and the qualities thereof, are fully set forth in United States Letters Patent, No. 13,599, granted to me on the 25th day of September, 1855.

In the accompanying drawings, I have illustrated the construction of an ordinary freight-car.

The parallel side-beams A A, of the proper length, are united at their ends, and at suitable intermediate points, by cross-beams or girders C C, secured thereto by means of metallic coupling-blocks H, fig. 7.

Each of these blocks H is made with a single lower or bottom projection, H″, to be inserted into the central fold of the side-beam (see fig. 4) of the frame, and with two upper projections H′ H′, formed at right angles to the first, so as to fit accurately within the double folds of the transverse beams C, (see fig. 5,) when laid thereon with their flanged faces downward, as illustrated in fig. 5.

The side-pieces A and girders C being thus coupled by means of the interposed blocks H H, are firmly secured by means of bolts or rivets *h h* passing through the ends of the beams A and C, and through the blocks, as shown in the drawings.

To the bottom frame thus constructed, of side transverse beams, upright beams B B are secured to form the sides and top of the car. These upright beams B, are made straight for a length equal to the height of the car, and then bend in a curve until they reach a plane at right-angles to their length.

They are formed of longitudinally-corrugated metal of the same description as the straight beams A and C, and are made to extend upward, vertically, from the bottom, or floor-frame, with their flanged faces *b b* outward. Bending and arching over inwardly from either side at the proper height, they meet, and are united centrally, and thus constitute an arched support for the roof of the car, as illustrated in fig. 2 of the drawings.

The lower end of each of these curved uprights is notched longitudinally, in each fold thereof, each notch being wide enough to pass over a fold of the girder when set down thereon at right-angles thereto, and deep enough to allow the ends of its flanges *b* to come into contact with the flange *c* of said girder, as illustrated in fig. 5.

When thus inserted in and upon the end of the girder C, to interlock therewith, as described, the joint of the two may be secured by means of bolts passing through their combined ends.

To make a yet stronger and firmer joint, however, I insert a knee-coupling, or block G, (fig. 8,) of solid metal, so grooved on its two faces as to fit upon and embrace the projecting folds of both the girders C and uprights B, at the angle thereof, and secure the whole by means of bolts passing through B, C and G, as illustrated in figs. 2 and 5.

Where it may be desirable to combine the uprights B with the side-beams A, independently of the girders C, I do so by means of the coupling-pieces H, which I place upon and secure to the side-beams, as hereinbefore described, (see fig. 4,) and then insert the ends of the uprights upon and between the two upper projections H′ H′ thereof, in like manner as upon the double-fold of a girder, C. (See fig. 6.)

The upper curved ends of the uprights B may overlap and be riveted together, or be secured by means of lap, or tie-plates, inserted and riveted in the folds thereof, or the entire arch, including the uprights on either side, may be preferably formed out of one unbroken beam, as indicated in the drawings. (See fig. 2.)

The sides and ends of the frame may be covered with smooth metallic plates, riveted in the usual manner to the flanges *b b* of the uprights B, said flanges presenting a smooth even surface therefor.

The top may be covered in like manner with smooth metallic overlapping plates, but I prefer to cover the top with sheets of corrugated metal, placed with their grooves or folds running longitudinally, as illustrated in the drawings figs. 1, 2, and 3.

The combination thus made of the transverse corrugations of the arched beams B, with longitudinal corrugations in the covering-plates F, gives very great strength in the structure without increase of weight.

The corrugated sheets F F may be most advantageously united at their ends in the manner clearly shown at *f*, fig. 1 of the drawings, and at the sides, as illustrated at *g*, fig. 2. These ends should meet over one of the arched supporting-beams B, (see *f*, fig. 1,) so as to be securely fastened thereto.

The number of arched top-pieces B, as well as of girders C, and stringer or longitudinal beams A, are proportioned to the amount of strain and weight to be borne by the car.

The bottom of the car is closed by means of arched sheets of corrugated metal D, (curved in the direction of the corrugations,) which are inserted between the girders C, so as to rest upon the flanges *c c* thereof, as illustrated in fig. 3 of the drawings, and span the intermediate space.

These arched sheets overlap at their edges so as to form an unbroken arch from end to end of the girders, and, from their form, brace and tie them, and impart great strength to the bottom of the car.

The flooring may be completed by means of wooden planks E E, laid across the girders over the arched-plates D in the usual manner, and be secured by nailing them into wooden strips *e e*, (fig. 3,) inserted for the purpose, and riveted into the central upper groove of the girders C, as illustrated in fig. 3.

I contemplate the combination of a wooden superstructure, with the platform constructed of the beams and girders A and C, and, although, I have herein described more particularly the construction of an ordinary covered freight-car, I contemplate the application of my invention substantially as herein set forth to the construction of coal-cars, and other cars of irregular forms, as well as to various descriptions of vehicles for ordinary uses.

The coupling-blocks H G may be varied as to the inclination of their grooves or projections, and of their faces, so as to fit into and support a joint formed at any desired angle other than a right angle, and where it is necessary to make the body of the car with curved rather than angular bottom and sides, curved beams, similar to the curved uprights B, may be combined with suitable side-beams, substantially as herein described.

The using of coupling-blocks H G may be dispensed with or superceded by the introduction of simple lap-plates inserted between the folds at the ends of adjoining beams to break their joints.

The advantages of a car thus constructed over those in common use, because of their superior strength and durability, economy in weight, facility of construction, and security against fire, must be too obvious to need enumeration or argument.

Having thus fully described my invention,

I claim therein as new, and desire to secure by Letters Patent—

1. The use of the corrugated-iron beams, constructed as described when applied to railway cars and other vehicles, in the manner and for the purposes herein set forth.

2. The combination of the curved top-pieces B with the side or base-pieces A, and coupling-pieces H and G, operating substantially as described.

3. The corugated covering F, arranged as described, in combination with the arched top-pieces B.

4. The coupling-pieces H G, or either of them, when constructed as described, and applied to the corrugated beams of a railway-car, substantially as herein set forth.

R. MONTGOMERY.

Witnesses:
G. B. TOWLES,
DAVID A. BURR.